3,451,835
READILY DISPERSIBLE INORGANIC PIGMENTS
Karl-Werner Ganter, Krefeld-Bockum, Joachim Nentwig, Krefeld, Hans Zirngibl, Duisburg, and Hans-Joachim Kappey and Horst Bornefeld, Krefeld-Bockum, and Walter Deissmann, Krefeld, Germany, assignors to Farbenfabriken Bayer Aktiengesellschaft, Leverkusen, Germany, a corporation of Germany
No Drawing. Continuation of application Ser. No. 467,761, June 28, 1965. This application June 28, 1967, Ser. No. 649,744
Claims priority, application Germany, July 28, 1964, F 43,592
Int. Cl. C09c 3/02
U.S. Cl. 106—308                7 Claims

ABSTRACT OF THE DISCLOSURE

Pigments coated with a minor proportion of a particular surfactant. The surfactant is the reaction product of a polyol having about 3 to 4 hydroxyl groups and 2 to 6 carbon atoms with about 1 to 5 mols of alkylene oxide per mol of polyol.

---

This application is a continuation of application Ser. No. 467,761, now abandoned.

This invention relates to inorganic pigments which can be readily dispersed in aqueous and organic media and to a process for the production of such pigments.

Inorganic pigments can only be dispersed with difficulty in synthetic resins and in aqueous plastic dispersions. For example, the production of a good dispersion of titanium dioxide in an oily binder requires a tedious and thus not very economic grinding process; moreover, the suspension prepared is usually not very stable. This undesirable property of inorganic pigments can be further intensified by the agglomeration phenomena which occur during the storage and the transport of the pigment. The difficulties mentioned above are due to the fact that, on the one hand, the pigment particles cannot be satisfactorily wetted by the binders or resins because of their surface properties, and on the other hand, they have a strong tendency to agglomerate because of their strong surface forces with one another. Nevertheless, it is desirable to split the pigment up into its smallest possible particles, i.e., to form a dispersion thereof, when it is being incorporated into a laquer system, so that there is no grain formation in the lacquer and so that the desired pigment properties, such as colour intensity and colour tone, can be obtained.

Many proposals have been made for eliminating this disadvantage of inorganic pigments. In accordance therewith, a dispersion-promoting agent can be added to the binders to promote the dispersion capacity of the pigment.

It has also been proposed to make the naturally organophobic surface of the pigment organophilic by a prior treatment with suitable substances in order to facilitate the dispersion in an organic medium. Suitable substances for effecting this include organo-silicon compounds, polyols, especially pentaerythritol, alkylene oxides and condensation products of high molecular weight obtained from alkylene oxides with amines, phenols or long-chain fatty alcohols.

The present invention provides a readily dispersible inorganic pigment, the surface of which carries a non-ionic surface-active reaction product of a polyol and an alkylene oxide.

We have found that these derivatives of polyhydric alcohols have a particularly good dispersion-promoting action when they are applied to the surface of pigment particles. Pigments which have been treated with one of the aforesaid derivatives, or with a mixture of two or more thereof, provide an excellent dispersion capacity, in synthetic resins or in aqueous synthetic resin dispersions, or in both of these media. The dispersion capacity is improved not only in relation to the untreated pigments but also in relation to the pigments which have been treated by prior known processes. Not only is there obtained a rapid dispersibility at the degree of division given by the particle size of the pigment concerned, but the resulting dispersion is very stable. In addition, treatment of the inorganic pigments with the aforementioned derivatives of polyols has a favourable effect on the technical pigment properties, for example on the oil factor, colour intensity and colour tone. Generally, a distinct improvement in the brightening power is also found. In particular, the undesirable haze formation in the finished lacquer is avoided owing to the good distribution of the pigment in the binder.

Any inorganic white or coloured pigment can be treated to provide readily dispersible pigments according to the invention. Particularly advantageous results are produced with titanium oxide, iron oxide and chromium oxide pigments, including the ferromagnetic substances which are based on iron oxide and chromium dioxide, such as those used for the production of magnetic sound, picture and similar record carriers.

Starting materials for preparing the derivatives to be employed can be polyhydric alcohols which generally contain 2 to 6 and advantageously 3 to 4 OH-groups, and 2 to 12, advantageously 3 to 6 carbon atoms, for example ethylene glycol, glycerine, hexanetriol, trimethylol ethane, trimethylol propane, trimethylol butane, pentaerythritol and sugar alcohols of pentoses and hexoses. The reaction products of trimethylol propane are particularly suitable.

It is not necessary for all of the OH-groups of the alcohols to be reacted with the alkylene oxides.

The inorganic pigments are aftertreated with compounds which are obtained by reaction of the aforesaid alcohols with alkylene oxides. The OH-groups of the aforementioned polyhydric alcohols are wholly or partially reacted with alkylene oxides, 1–10 and advantageously 1–5 mols of alkylene oxide being introduced per OH group. The alkylene oxides can be ethylene oxide or propylene oxide, particularly good results being obtained with ethylene oxide. The following are to be mentioned as examples of such etherification products: butane-1,3-diol which has been reacted with 5 mols. of propylene oxide; hexanetriol which has been reacted with 4 mols of ethylene oxide; trimethylol propane which has been reacted with 3.5 mols. of propylene oxide; and also ethylene glycol which has been reacted with 3 mols. of ethylene oxide or 2 mols. of propylene oxide.

An excellent effect according to the present invention is shown by trimethylol propane which has been reacted with 3.5–6 mols of ethylene oxide.

Measured quantities of the aforementioned reaction products of polyhydric alcohols can be added without difficulty to the pigment. Many of the substances mentioned by way of example have a good solubility in water, while others can at least be satisfactorily dissolved in organic solvents. It is particularly advantageous that the substances which are most effective (such as the ethylene oxide addition products of trimethylol propane) are liquids, as they can be applied to the pigment in pure form without using diluents and solvents. For the further processing of the aftertreated pigments, it is advantageous that the said reaction products of the polyhydric alcohols are not physiologically objectionable.

It is possible to control within wide limits the dispersion properties of the inorganic pigments using the said products. Thus, pigments can be produced which can be satisfactorily dispersed in the same way in both aqueous and organic media. A pigment which has been treated with 0.25% by weight of trimethylol propane polyglycolether can be satisfactorily dispersed in conventional synthetic resins and also in aqueous plastic dispersions.

The stage during the production of the pigment at which the agent influencing the dispersing capacity is added to the pigment is unimportant. The surface treatment can take place by way of a liquid auxiliary phase. In this case, the solid substance to be treated, or its moist filter cake, is suspended in water or in an organic liquid. The reaction products of the polyols, in pure form or in solution, or emulsified in an auxiliary liquid, are added to the dispersion. Depending on the concentration, the suspension is subjected to a suitable stirring and/or grinding treatment. The duration of the treatment depends on the stirring and grinding intensity and is 5 to 20 minutes with intimate mixing. Thereafter, the liquid auxiliary phase is separated out and worked up in the usual way. However, the coating can also be carried out, advantageously with water-soluble surface-active agents, by admixing the surface-active substances directly in liquid form or in emulsified form with the solid to be treated, prior to or during the grinding process for example, in a pin mill, ball mill, cylinder mill or steam jet mill. In another embodiment, the surface-active substances are mixed with the inorganic pigment to be treated in a filter cake by means of a kneading process. This is followed by drying and possibly grinding. The additives generally are added to the pigment in quantities of 0.05 to 2% by weight, based on the dry pigment, and in particularly economic manner in quantities of 0.1 to 0.75% by weight, since smaller quantities than 0.1% by weight generally do not have any adequate effect, and larger quantities than 1% are per se not harmful, but do not show any further improvement in the effect.

The surface treatment of titanium dioxide, which is particularly important as a pigment and filler in the paint and plastics industries, is discussed below in detail by way of example.

The $TiO_2$ obtained by hydrolysis of the sulphate or chloride or by burning $TiCl_4$, and which is in the form of rutile and anatase, can be treated with the surface-active agents used according to the invention during various phases of its manufacturing process.

After several preliminary stages, there is formed for example a furnace clinker, which is ground and classified. The fine material is subjected to an inorganic aftertreatment, which can consist in the precipitation of for example $Al(OH)_3$, $SiO_2$ or $TiO_2$. This aftertreatment takes place in a suspension with about 20% by weight of solid substance at 60° C. and with intensive stirring. Before the precipitation, or during or immediately thereafter, the desired additives can be added to the white sludge. The sludge is then filtered through a rotary filter and washed. The filtered material of this first rotary filter is then once again mashed with water and, after thoroughly mixing, is supplied to a second rotary filter. A second possibility of adding a surface-active substance exists during the mashing operation. The filtered material from the second rotary filter is once again washed and then dried at 140 to 170° C. The filtered material from the second rotary filter, having a solid content of about 60% by weight, can also be mixed by a kneading process with a surface-active agent used according to the invention.

After normal drying, the material is ground in a steam jet mill. Immediaely before the grinding, the substance used for the aftertreatment can be sprayed on to the dried material in suitable manner, the pigment being for example initially ground in a pin mill. The reaction products of the polyols can also be added to the ground material or to the steam directly on introduction into the jet mill.

$TiO_2$ furnace clinkers, which are to be incorporated without further inorganic aftertreatment into the plastic, can for example be mixed with a surface-active agent used according to the invention during a suitable grinding process, using a cylinder, ball or pendulum mill. It is not necessary to follow this with a second grinding, for example in a steam jet mill.

A so-called dissolver test is used for testing the dispersion behaviour of $TiO_2$ pigments in synthetic resins. The dispersion is effected by means of a disc which is fitted tangentially with teeth in a highly viscous resin-solvent mixture of 65% by weight of alkyd resin (long-oil alkyd resin modified with soya bean oil, phthalic anhydride content 26%, soya bean oil content 63%) in white spirit. A beaker with an internal diameter of 65 mm. is used as the vessel. The dissolver disc has a diameter of 40 mm, and the distance of the disc from the bottom of the beaker is 10 mm.

160 g. of the resin solution are initially supplied and 168 g. of pigment are stirred thereto to form a paste within 5 minutes at a speed of rotation of 100 to 1500 r.p.m.; stirring is then continued for 5 minutes at 5000 r.p.m. During this time, the paste becomes heated to about 60° C. 134 g. of paste are now taken from this mixture and diluted with 25 g. of white spirit ($\delta=0.78$ g./cc.). A grindometer value (ASTM standard method 4411) is established in respect of this dispersion and, in addition, after adding a drying agent (Co, Mn, Pb-naphthenate, 1:2 in white spirit), a lacquer film is produced on a glass plate. The dry film is judged visually with regard to the number of undispersed agglomerates and is evaluated with the notations 1 to 7.

The dispersion behaviour of $TiO_2$ pigments in aqueous plastic dispersions is tested by the PVA test.

5 g. of pigment are gently stirred with 5 g. of distilled water, using a glass rod, and then thoroughly stirred with 6.5 g. of polyvinyl acetate, 50% dispersion in water (43.7% polyvinyl acetate, 6.5% tricresyl phosphate, 4.3% dibutyl phosphate). The polyvinyl acetate dispersion is adjusted beforehand to pH 7.28, by means of about 3 drops of 2% ammonia solution. The paste prepared is added to a black-and-white card (manufacturer: Erichsen, Sheet 74–D) and drawn off with a 90μ film drawing device. The film dried at room temperature is visually observed as regards the number of undispersed agglomerates and evaluated with the notations 1 to 7.

A series of tests are described below relating both to the nature of the aftertreatment and also to examples of the surface-active substances according to the invention. The values for the dispersion properties of the pigments, as determined by the methods set forth, are indicated in the table.

The following examples illustrate the invention:

Example 1 (comparison example)

A $TiO_2$ pigment with a rutile structure, prepared by hydrolysis of titanium sulphate, was provided with an inorganic sheath by precipitating $Al(OH)_3$ and $SiO_2$ in an aqueous slurry onto the pigment particles. The pigment containing about 95% of $TiO_2$ was dried and then micronised in a jet mill operated with superheated steam. The dispersibility of the ground pigment is shown in table under No. 0.

Example 2

A rutile pigment, as described in Example 1, was moistened after drying with a 25% aqueous solution of a reaction product of trimethylol propane and 3.5 mols. of ethylene oxide per mol. of trimethylol propane, and then ground by steam jet in a manner analogous to Example 1.

0.25% by weight of trimethylol propane reaction product, related to dry pigment, was used, see the table.

The following reaction products of polyols were investigated in a similar manner:

No. 2.—0.50% of trimethylol propane plus 3.5 mols of ethylene oxide in 40% aqueous solution.
No. 5.—0.25% of trimethylol propane plus 6.0 mols of ethylene oxide in 25% aqueous solution.
No. 6.—0.50% of trimethylol propane plus 6.0 mols of ethylene oxide in 40% aqueous solution.
No. 8.—0.50% of trimethylol propane plus 6 mols of ethylene oxide in 40% aqueous solution.
No. 13.—0.25% of trimethylol propane plus 3.5 mols of propylene oxide in 25% aqueous solution.

Example 3

A rutile pigment, as described in Example 1, after having been dried, was sprayed with the quantities as indicated below of a polyol-alkylene oxide reaction product and then ground by steam jet, see the table.

The following compounds were used in a similar manner:

No. 4.—0.30% of trimethylol propane plus 3.5 mols of 100% ethylene oxide.
No. 7.—0.30% of trimethylol propane plus 6.0 mols of 100% ethylene oxide.
No. 9.—0.30% of trimethylol propane plus 10.0 mols of 100% ethylene oxide.
No. 11.—0.3% of butane-1,3-diol plus 5 mols of 100% ethylene oxide.

Example 4

The washed filter cake of a rutile pigment according to Example 1, with 50% pigment content, was kneaded with 0.50% by weight of trimethylol propane and 3.5 mols of 100% by weight of alkylene oxide, based on dry pigment, thereafter dried at 160° C. and ground by steam jet, (see the table).

In similar manner, the following substances were used:
No. 10.—0.05% by weight of trimethylol propane plus 10.0 mols of 100% ethylene oxide.
No. 12.—0.30% by weight of butane-1,3-diol plus 5.0 moles of 100% ethylene oxide.

The following examples show that the reaction products of the polyols, when they were merely added as dispersion auxiliaries, show scarcely any effect. Pigments which have ben aftertreated according to the present invention are substances having completely changed surface properties by comparison with the pure pigment.

Example 5

A titanium dioxide pigment having a rutile structure, which had been aftertreated in the usual way with inorganic chemicals and contained about 95% by weight of $TiO_2$, was dried and then micronised in a jet mill operated with superheated steam.

(a) Some of the ground pigment was dispersed in an alkyd resin. Its dispersibility was evaluated with notation 5 and 80μ.
(b) Another part of the ground pigment was dispersed in the aforementioned alkyd resin, which contained 0.25% by weight of trimethylol propane, reacted with 3.5 mols of ethylene oxide per mol, based on pigment being used. The dispersion capacity was evaluated as notation 5 and 75μ.
(c) The addition of the same substance prior to the grinding according to the table caused a dispersibility of 1–2 at 25μ.

It is therefore quite clear that the polyol derivatives used according to the present invention only develop their action when they are applied in the manner set forth to the pigment surface, but not when they are added to a binder.

Example 6

(a) An iron oxide pigment, after being dried, was micronised in a jet mill operated with superheated steam. One sample of the ground pigment was dispersed in an alkyd resin by means of a dissolver disc at 5000 r.p.m. After 6 minutes, the Hegman value was 23μ.

(b) The same iron oxide pigment as in Example 6(a) was moistened prior to the jet grinding with 0.3% by weight, based on the dry pigment, of trimethylol propane, reacted with 6 mols of ethylene oxide per mol, in 25% aqueous solution. A sample of this ground pigment, produced with the same dispersion as in Example 6(a), showed a Hegman value of 9μ after 4 minutes.

What is claimed is:

1. A pigment selected from the group consisting of titania, silica, iron oxide and chromium oxide having a coating thereon about 0.05 to 2 weight percent, based on said pigment, of a surface active reaction product of a polyol having about 3 to 4 hydroxyl groups and about 2 to 12 carbon atoms with about 1 to 5 mols of an alkylene oxide per hydroxyl group of said polyol.

2. Pigment as claimed in claim 1 wherein said surface active product is present in proportion of about 0.1 to 0.75 weight percent.

3. Pigment as claimed in claim 1 wherein said alkylene oxide is a lower alkylene oxide.

TABLE

| Consec. No. | Alcohol derivative added to the pigment | Addition of alcohol derivative | | | Dispersing properties of the pigment | | |
|---|---|---|---|---|---|---|---|
| | | Acc. to Example | Quant. percent based on | Form | Alkyd resin notation | Hegman-value, μ | PVA notation |
| 0 | | | | | 5 | 80 | 6–7 |
| 1 | Trimethylol propane, reacted with 3.5 mol ethylene oxide/mol. | 1 2 | 0.25 | Aqueous soln. 25% | 1–2 | 25 | 2–3 |
| 2 | do | 2 | 0.5 | Aqueous soln. 40% | 1 | 20 | 2 |
| 3 | do | 5 | 0.5 | 100% | 1–2 | 25 | 2 |
| 4 | do | 4 | 0.3 | 100% | 1–2 | 20 | 2 |
| 5 | Trimethylol propane, reacted with 6 mol ethylene oxide/mol. | 2 | 0.25 | Aqueous soln. 25% | 1–2 | 20 | 2–3 |
| 6 | do | 2 | 0.5 | Aqueous soln. 40% | 1 | 20 | 2 |
| 7 | do | 4 | 0.3 | 100% | 1–2 | 25 | 2 |
| 8 | Trimethylol propane, reacted with 10 mol ethylene oxide/mol. | 2 | 0.5 | Aqueous soln. 40% | 1–2 | 25 | 2–3 |
| 9 | do | 4 | 0.3 | 100% | 2 | 30 | 3 |
| 10 | do | 5 | 0.5 | 100% | 1–2 | 25 | 3 |
| 11 | Butane-1,3-diol, reacted with 5 mol ethylene oxide/mol. | 4 | 0.3 | 100% | 2 | 30 | 2 |
| 12 | do | 5 | 0.3 | 100% | 2 | 30 | 2–3 |
| 13 | Trimethylol propane, reacted 3.5 mol propylene oxide/mol. | 2 | 0.25 | Aqueous soln. 25% | 1–2 | 25 | 2–3 |

4. Pigment as claimed in claim 1 wherein said alkylene oxide is ethylene oxide.

5. Pigment as claimed in claim 1 wherein said polyol is trimethylol propane.

6. Titania pigment coated with about 0.05 to 2 weight percent, based on said pigment, of the reaction product of trimethylol propane and about 3.5 to 6 moles of ethylene oxide per mole of trimethylol propane.

7. Process of preparing readily dispersible inorganic pulverous pigment composition which comprises coating a particulate pigment selected from the group consisting of titania, silica, iron oxide and chromium oxide with about 0.05 to 2 weight percent based on said pigment of a surface active reaction product of a polyol having about 3 to 4 hydroxyl groups per molecule and about 2 to 12 carbon atoms per molecule with about 1 to 5 moles of alkylene oxide per hydroxyl group of said polyol.

References Cited

UNITED STATES PATENTS 2,907,670  10/59  Katz et al.

FOREIGN PATENTS 896,067  5/62  Great Britain.

JAMES E. POER, *Primary Examiner.*

U.S. Cl. XR

106—300, 302, 304

PO-1050
(5/69)

UNITED STATES PATENT OFFICE
CERTIFICATE OF CORRECTION

Patent No. 3,451,835      Dated June 24, 1969

Inventor(s) KARL-WERNER GANTER, JOACHIM NENTWIG, HANS ZIRNGIBL, HANS-JOACHIM KAPPEY, HORST BORNEFELD, and WALTER DEISSMANN It is certified that error appears in the above-identified patent and that said Letters Patent are hereby corrected as shown below:

Column 5, line 50, "0.05%" should be --0.50%--

SIGNED AND
SEALED
FEB 17 1970

(SEAL)
Attest:

Edward M. Fletcher, Jr.
Attesting Officer

WILLIAM E. SCHUYLER, JR.
Commissioner of Patents